June 3, 1941. S. GRONICH Re. 21,817
MEAT CHOPPING MACHINE
Original Filed Aug. 12, 1939
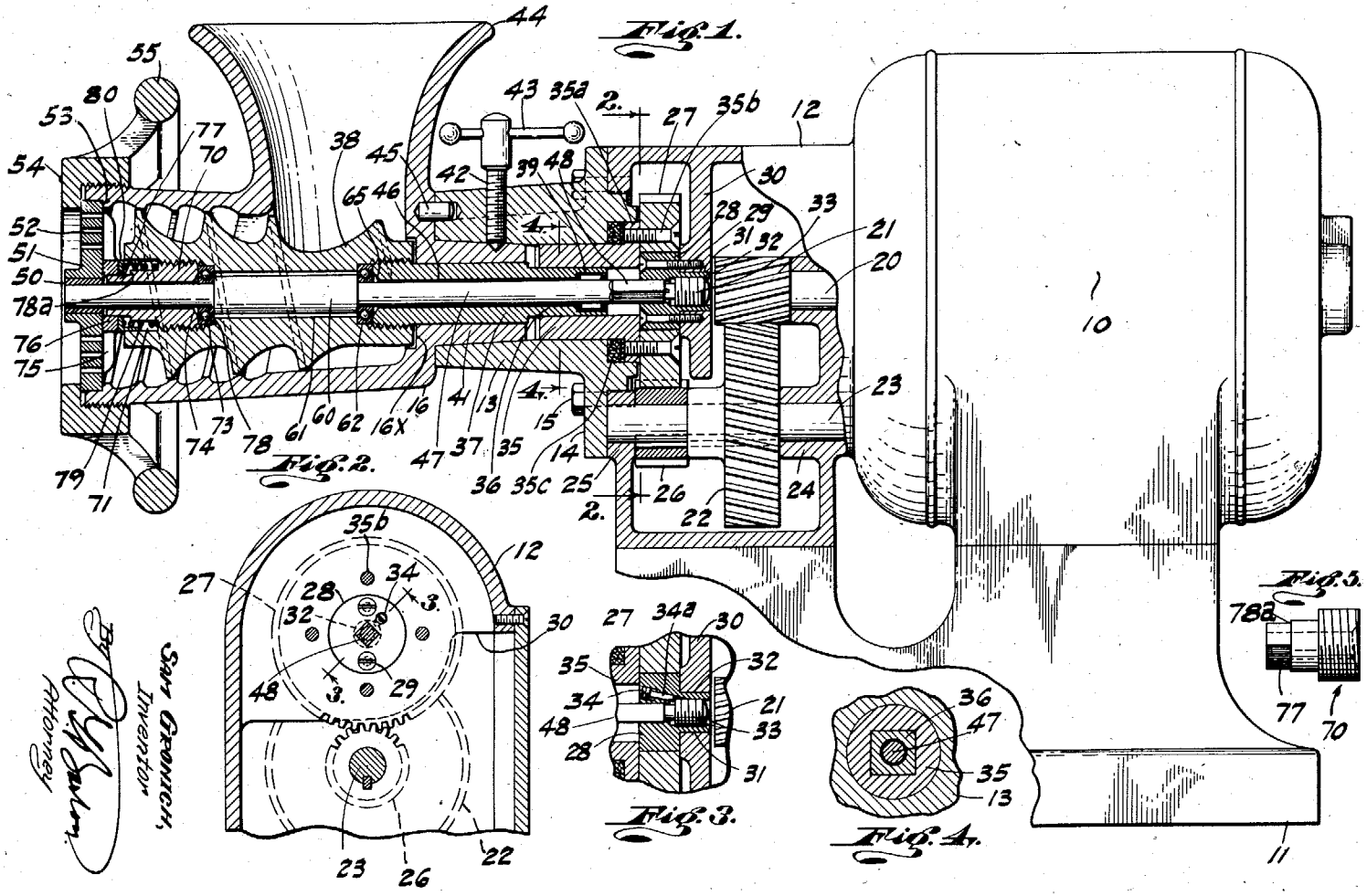

Reissued June 3, 1941 Re. 21,817

UNITED STATES PATENT OFFICE 21,817

MEAT CHOPPING MACHINE

Sam Gronich, Los Angeles, Calif.

Original No. 2,222,614, dated November 26, 1940, Serial No. 289,845, August 12, 1939. Application for reissue November 29, 1940, Serial No. 367,833

11 Claims. (Cl. 146—189)

This invention pertains to grinders, more particularly to those of the meat chopper type.

In the conventional type of meat grinder, the outer end of the worm has a tendency to oscillate, because of poor support, which allows the flutes on the worm and the flutes in the casing to come into contact with each other, which causes rapid wear and also causes particles of metal to mix with the meat.

In this improved grinder, stationary, non-rotatable bearing means is provided extending along the axis of the worm, which furnishes a true axial support upon which the worm turns, thereby preventing oscillation of the worm and consequently eliminating all wear of the aforementioned flutes that the worm would otherwise cause. The bearing means provided by this invention also reduces wear of the driving shaft of the worm, which has hitherto been a serious defect in meat grinders. These defects in wearing quality cause the oscillation of the rotary parts to become progressively worse, until, in a relatively short time, the fluted parts become useless and have to be replaced. This grinder is also constructed in such a manner as to eliminate wear due to endwise thrust of the worm.

In the conventional type of grinder, the cutting plate and knife are jammed against each other by a clamping ring, and in turn jammed against the front end of the worm, which in turn jams against the back end of the cylinder; this being the method now in use to hold these parts reasonably secure.

In the grinder hereinafter described and claimed, the front of the axis shaft, the main bearing means, is supported by the perforated cutting plate, and this plate is tightened against the shoulder in the front of the cylinder by the ring, and to eliminate the point of friction between the cutting knife, and this plate, a spring pressure is used which keeps the knife in proper position at all times, and at the same time minimizes the friction in the meat grinder. Because this extra friction does not exist in this grinder, there is practically no heating of the meat as it passes through the cutting plate. In the conventional type of grinder, the friction between the cutting knife and plate generates a great amount of heat which has a tendency to discolor and taint the meat in a comparatively short time.

In the conventional grinder, the driving gear is solid and the driving shaft of the worm is not centered properly, and is more or less floating.

In this grinder, the driving gear has an open center allowing the hub which supports the axis shaft to come through and center all the working parts so as to make it feasible to arrange all the parts in their proper cooperative relation.

By eliminating all of the points of objectionable friction in this grinder, it has been made possible to use much less power for a given amount of work, allowing cheaper and much more satisfactory operation of grinding equipment.

Owing to the improvements above pointed out, which it is among the objects of this invention to secure, and to other features of invention which will hereinafter appear, the grinder provided by this invention possesses a long wearing quality and operates in a more satisfactory manner than prior devices of its class.

Referring to the accompanying drawing which illustrates a preferred embodiment of the invention, now reduced to practice—

Fig. 1 is a view partly in side elevation and partly in vertical mid-section.

Fig. 2 is a partial section taken on line 2—2 of Fig. 1.

Fig. 3 is a sectional detail on line 3—3 of Fig. 2.

Fig. 4 is a sectional detail on line 4—4 of Fig. 1.

Fig. 5 is a side elevation separately showing the bushing shown in the left-hand portion of Fig. 1.

Referring in detail to the drawing, the casing portion of the device is shown as comprising a motor casing 10 furnished with an attaching base 11, said motor casing having a lateral extension 12 constituting a gear casing. Said gear casing 12, in turn, supports a tubular or somewhat frusto-conical hollow bracket 13 which is furnished with an attaching flange 14 whereby, by the use of cap screws 15, said bracket is secured to said gear casing 12. The grinder casing 16 is secured to and sustained by said bracket 13.

The means for holding the various parts of the device in their assembled relation, and the operating mechanism, will now be described in detail, starting with the driving shaft 20 of the motor (not shown) contained within casing 10. Said shaft 20 has fixed to it a driving pinion 21 in mesh with a driven gear 22 fixed to a shaft 23 furnished with bearings 24 and 25. Shaft 23, in turn, has fixed to it a pinion 26 which meshes with a transmission gear 27 having its bearing upon an arbor 28 which, by screws 29, is secured to a hanger plate 30 that depends from the top wall of the gear casing 12.

Said hanger plate 30 has through it an opening 31, and the arbor 28 is furnished with a tubular, axial extension 32 which fits within said opening and thus cooperates with the screws 29 in holding the arbor in its mounted position. Said arbor extension 32 is internally screw threaded and has screwed into it an adjusting screw 33, the function of which will hereinafter appear. Said adjusting screw is maintained in its adjusted position by means of a finger 34a carried by a set screw 34 screwed into the outer end of the arbor 28.

The aforementioned transmission gear 27 has axially secured to it an extension 35 having a circular exterior contour but having through it a square passage within which is slidably fitted the squared end portion 36 of a tubular coupler shaft 37. The outer end portion of said shaft 37 is externally screw threaded and has screwed on to it the inner end portion of the tubular body of the grinding worm 38.

The inner end portion of the tubular coupler shaft 37 has its internal diameter enlarged to receive a needle bearing 39 interposed between it and the stationary shaft 47.

The grinding casing 16 has a circular recess 16x in its rear end, which encloses, in a slightly spaced relation, the inner end of the grinding worm 38. The ball bearing structure 62 and 73 (hereinafter described more in detail) maintain the tubular shaft structure in a rotatable but longitudinally fixed relation to the axis shaft 47, hence by adjusting properly the screw 33, against which the inner end of the axis shaft abuts, the worm 38 is properly positionable to maintain its inner end in a slightly spaced, frictionless relation to the bottom of the recess 16x.

The grinder casing 16 is furnished with a tapered, tubular extension 41 which fits within the extension 13 of the gear casing and is secured therein by means of a clamping screw 42 having radial operating arms 43. The hopper portion 44 of the casing 16 abuts against the end of the extension 13, said extension being thickest in its upper portion, where a dowel pin 45 is used to aid in preventing rotational displacement.

The body portion of the coupler shaft 37 rotatably fits within the extension 41 of the grinding casing, and the extension 35 of the gear 27 fits rotatably within the inner portion of the gear casing extension 13. The coupler shaft 37, together with its extension 36 and the worm 38 constitute a tubular shaft structure which is furnished with an axial passage 46, through which extends, with a very loose fit, a non-rotatable axis shaft 47 having a squared inner end portion 48 which abuts against the head of the adjusting screw 33. Said shaft 47 is continued to the outer end of the device, where it is surrounded by a sleeve 50 which fits within the hub portion of the non-rotatable grinder disk 51 furnished with meat-delivery passages 52. The outer end of the grinder casing 16 has an annular shoulder 53 inside its mouth portion, against which the disk 51 is tightly held by means of an apertured cap 54 which is screwed on to the outer end portion of said casing by the aid of a hand wheel 55 carried by said cap.

In spaced relations to its ends, said shaft 47 is furnished with a diametrically enlarged portion 60. Through the grinding worm 38 extends an elongated axial chamber 61, a part of which is occupied by said shaft portion 60, there being a slight annular clearance maintained around this portion of the shaft. Between the annular shoulder afforded by the inner end of said shaft portion 60 and the adjacent end of the coupler shaft 37 is interposed the ball bearing structure 62 of the two concentric rings type with a series of balls in the intervening raceway. The inner ring of this bearing structure is in a fixed relation to the small shaft portion 47 and also abuts against the annular shoulder provided by the adjacent enlarged shaft section 60.

The outer bearing ring occupies an annular recess provided for it in the worm 38 and is gripped in this position by the adjacent end of the screwed in tubular transmission shaft 37, this end of said tubular shaft being interiorly beveled at 65 to avoid frictional contact with the non-rotating inner ring of the bearing.

Beyond the outer end of the enlarged shaft portion 60, there is mounted within the worm 38, an externally screw threaded terminal shaft section formed by a bushing 70 which forms the outer end portion of the tubular, rotatable shaft structure which surrounds the stationary axis shaft 47, and which includes the worm 38. Said bushing 79 is screwed into the diametrically enlarged outer end portion 71 of the elongated chamber 61 within the worm 38 and its inner end abuts against the outer ring of the ball bearing structure 73 shown as being of the same size and shape as the already described ball bearing 62.

Like the coupler shaft 37, the bushing 70 has its end which is adjacent to the ball bearing interiorly beveled (at 74) so as not to frictionally contact with the inner ring of the bearing. The ball bearing structure 73 need not be described in further detail, as it is arranged in a manner corresponding to that of the ball bearing 62 already described.

The rotary cutter blades 75 are carried by a hub 76 which is slightly slidable on the diametrically reduced square outer end portion 77 of the terminal shaft section or bushing 70, so as to slide somewhat (as far as the shoulder 78a) in relation to this shaft section, but be positively rotated thereby. In order to keep the cutter blades 75 in a proper contactual relation to the inner face of the disk 51 a spiral compression spring 79 presses the rotary cutter, an angularly cup shaped washer 80 being interposed between said spring and the hub 76 of said cutter.

The bottom of said cup-shaped washer 80 has through it a square opening through which the square part 77 of the bushing 70 extends with a working fit. The part of the bushing which is surrounded by all except the outer end portion of the spring 79 is unthreaded and has its diameter somewhat reduced in order to afford an annular clearance for said spring to occupy.

The ball bearings 62 and 73, located respectively at the inner and the outer end of the enlarged portion 60 of the axis shaft 47 not only eliminate friction in relation to the periphery of said shaft but also greatly reduce end thrust friction.

Referring to additional structural details, the extension 35 of the transmission gear 27 is furnished with an attaching flange 35a, and screws 35b to extend through said gear and are screwed into threaded openings through said flange. The basal portion of the gear casing extension 13 is annularly recessed to receive said flange 35a and also to make room for a resilient washer or gasket 35c which aids in making an oil-tight connection between the gear casing and the grinder section of the casing structure.

One of the meritorious features of the invention resides in the efficient manner in which the meat or other substance being ground is protected from having any lubricating substance mingled with it. Nevertheless, no appreciable heat is generated by friction, one reason for this being that all the thrust caused by the reaction of the meat upon the worm 38 and knives 75 is absorbed by the annular shoulder 78 at the outer end of the diametrically enlarged portion 68 of the axis shaft 47.

When the grinder is in operation, the reaction of the meat being ground upon the rotary cutter knives 75, as the meat is severed between said knives and the inner face of the disk 51, causes the hub 76 to retract the cup-shaped washer 80 against the opposition of spring 79. This retraction may continue until the outer face of the bottom of the said washer is flush with the outer end of the worm, said washer being arrested at this point by the shoulders 78*a*. Hence, during the grinding operation, a substantially continuous well sealed surface is presented between the bushing 70 and the worm to keep the meat from working into any part of the bearing structure.

It is to be understood that the present disclosure is for the purpose of illustration only, and that this invention includes all modifications and equivalents which fall within the scope of the subject matter claimed.

It is claimed:

1. In a grinder, a casing structure provided with an elongated passage of a generally circular cross section and made up of sections of different diameters, a portion of said passage forming a grinding chamber, a non-rotatable shaft, supported by said casing and extending axially through said passage, a series of tubular members individually journaled upon said shaft and connected with each other to rotate in unison, one of said members being a grinding worm located within said grinding chamber and constituting a member adjacent to one end of said series of rotatable members, a motor, and means operatively connecting with said motor the rotatable member of said series which is located farthest from said worm.

2. In a grinder, a casing structure provided with an elongated passage of a generally circular cross section and made up of sections of different diameters, a portion of said passage forming a grinding chamber, a non-rotatable shaft supported by said casing and extending axially through said passage, a series of tubular members individually journaled upon said shaft and connected with each other to rotate in unison, one of said members being a grinding worm located within said grinding chamber and constituting a member adjacent to one end of said series of rotatable members, a motor, means operatively connecting with said motor the rotatable member of said series which is located farthest from said worm, a disk having meat delivery apertures and fixedly mounted in the delivery end portion of said grinding chamber, said disk having a central aperture wherein is supported the adjacent end portion of the aforesaid non-rotatable shaft, a rotary cutter positioned to act with a shearing cut over the inner face of said disk, means whereby said cutter is mounted in a splined relation to the aforesaid tubular rotatable shaft to rotate therewith but vary somewhat in its position with relation to the length thereof, and spring means carried by rotatable shaft structure and yieldingly pressing said cutter toward the inner face of said disk.

3. The subject matter of claim 2 and, an adjustable abutment for non-rotatable shaft located at its inner end and in axial alinement therewith.

4. In a device of the kind described, a motor casing having a gear casing extension, a hanger within said casing, an arbor supported by said hanger in a fixed relation thereto, a support having a frusto-conical recess at its outer end fastened to said gear casing, a grinder casing having at one end a tapered tubular extension projecting into and secured within said frusto-conical recess, said grinder casing having at its opposite end a discharge opening furnished internally with an annular outwardly directed shoulder, a disk provided with meat discharge openings, means clamping said disk against said shoulder, said disk having a central opening, an axis shaft non-rotatably mounted with one of its end portions mounted in said opening of said disk and its opposite end portion mounted in the aforesaid arbor, said axis shaft supporting a rotary shaft structure including a meat cutting worm within said grinding casing, a gear rotatably mounted upon said arbor, an outwardly directed extension secured to said gear in a concentric manner, said extension having a square passage through it, a coupler shaft rotatably mounted on said axis shaft and slidably fitted within said extension of said gear, and a grinding worm rotatably supported upon said axis shaft and secured concentrically to said coupler shaft to be driven thereby.

5. In a meat grinder, a casing structure including a grinding chamber, a gear casing, and an intermediate section whereby the portion of the casing structure containing said grinding chamber is connected with said gear casing; an axis shaft extending through said grinding chamber and said intermediate casing section; an arbor, hanger means whereby said arbor is non-rotatably supported by the casing structure, said axis shaft having one of its end portions non-rotatably supported by said arbor, said arbor having an internally screw threaded portion, a screw member in said screw threaded portion forming an abutment for the adjacent end of said axis shaft, a tubular shaft structure journaled upon said axis shaft and including a grinding worm, said tubular shaft structure being held against lengthwise movement in relation to said axis shaft; a gear mounted rotatably on said arbor; and means whereby said gear is operatively connected with said tubular shaft structure to rotate the latter while allowing for longitudinal adjustment thereof, the aforesaid screw member being longitudinally adjustable within the arbor which contains it for the purpose of maintaining the worm in the proper longitudinal position in relation to the portion of the casing wherein it is contained.

6. The subject matter of claim 5 and, the means whereby said gear is operatively connected with said tubular shaft structure consisting of a tubular extension secured to said gear and projecting centrally from one face thereof and surrounding said axis shaft, and a portion of said tubular shaft structure having a slidable, non-rotatable connection with said tubular extension.

7. In a meat grinder, a casing structure including a grinding chamber, a gear casing, and an intermediate section whereby the portion of the casing structure containing said grinding chamber is connected with said gear casing; and axis shaft extending through said grinding chamber and said intermediate casing section; a disk located within the discharge portion of said grinding chamber, said grinding chamber having an internal annular shoulder; a cap screwed on to the discharge portion of the grinder part of the casing structure, said cap clamping said disk against said annular shoulder, said axis shaft having a front end portion which projects into the central portion of said disk and is in part supported thereby, a cylindrical shaft structure surrounding said axis shaft and including a bushing rotatably mounted upon the portion of said axis shaft adjacent to said disk, said bushing having an outer end portion which is square in cross-section and meets shoulders at its inner end, a rotary cutter having a hub with a square opening through it whereby it is slidably mounted upon said square portion of said bushing to rotate therewith and be limited in its inward sliding movements by the last recited shoulders, a grinding worm in the aforesaid grinding chamber, said worm having through it an axial chamber circular in cross-section and diametrically enlarged in its outer end portion to have the inner portion of said bushing screwed into it, thus providing an externally circular clearance around the square portion of said bushing and for a short space inwardly adjacent thereto, said bushing being diametrically reduced throughout said short space, a spiral compression spring around said bushing and occupying said space, and a cup shaped washer encircling the outer portion of said spring and having through its bottom a square opening, thus providing it with an apertured portion which fits slidably around the aforesaid square portion of said bushing and which is pressed by said spring against the hub of said rotary cutter to keep the latter in a proper operative relation to said disk.

8. The subject matter of claim 7 and, the shoulders of said bushing adjacent to its square portion arresting the inward movement of said cup-shaped washer at a point where the outer face of its bottom is substantially flush with the outer end of said worm.

9. In a grinder, a casing structure having a passage, one part of which forms a grinding chamber, a non-rotatable shaft extending through said passage and supported by said structure, a rotary tubular member within the casing passage and journaled on the non-rotatable shaft, said rotary member including as a part thereof a worm having an open ended passage extending from one end to the other of the worm for receiving the non-rotatable shaft, means for holding the rotary member against longitudinal movement on the non-rotatable shaft, means for effecting longitudinal adjustment of the rotary member and non-rotatable shaft with respect to the casing, and means for driving the rotary member.

10. In a grinder, a casing structure having a passage, one part of which forms a grinding chamber, a non-rotatable shaft extending through said passage and supported, and held against lateral movement, by the casing at both ends of the grinding chamber, a rotary tubular member within the casing passage and journaled on the non-rotatable shaft, said rotary member including as a part thereof a worm having an open ended passage extending from one to the other end of the worm for receiving the non-rotatable shaft, means for holding the rotary member against longitudinal movement on the non-rotatable shaft, means for effecting longitudinal adjustment of the rotary member and non-rotatable shaft as a unit with respect to the casing, and means for driving the rotary member.

11. In a grinder, a casing structure having a passage, one part of which forms a grinding chamber, a non-rotatable shaft extending through said passage, a rotary tubular member within the casing passage and journaled on the non-rotatable shaft, said rotary member including as a part thereof a worm having an open ended passage extending from one end to the other of the worm for receiving the non-rotatable shaft, an extrusion cutter plate adjustably fixed to the casing and in which the non-rotatable shaft has a bearing, a cutter element fixed to the rotary shaft, to rotate therewith, and set against the extrusion plate, means for holding the rotary member against longitudinal movement on the non-rotatable shaft and resilient means interposed between the rotary member and the cutter elements to permit an adjustment of the cutter elements longitudinally of the non-rotatable shaft relatively to the rotary member.

SAM GRONICH.